Patented Aug. 3, 1943

2,325,880

UNITED STATES PATENT OFFICE 2,325,880

LUTIDINE COMPOUND

George Riethof, Mount Lebanon, Pa., assignor to Pittsburgh Coke & Iron Company, Pittsburgh, Pa., a corporation of Pennsylvania No Drawing. Application August 15, 1942, Serial No. 454,997

3 Claims. (Cl. 260—290)

This invention relates to lutidine compounds, and it is particularly concerned with a new crystalline compound of 2,6-lutidine combined with thiourea and water in a molar ratio of approximately 1:2:1; and it further comprises a method of producing such thiourea-lutidine compounds in which the thiourea and 2,6-lutidine are mixed and reacted in aqueous solution, the solution is cooled and the crystalline product obtained is separated from the mother liquor; all as more fully hereinafter set forth and as claimed.

Various alkyl pyridines such as the picolines and lutidines are produced in the destructive distillation of coal tar and are present in the basic coal tar oils from which they may be recovered by various methods. The 2,6-lutidine component of such basic coal tar oils may be recovered in substantially pure form, for example, by the method described in my copending application for United States Letters Patent Serial No. 404,932, filed July 31, 1941. In my said copending application I have described my discovery that 2,6-lutidine has a characteristic reaction with urea forming under certain conditions a crystalline compound not very soluble in water and containing urea combined with 2,6-lutidine in a molar ratio of 2:1. I have described also the use of this discovery in a method for the separation of 2,6-lutidine from a mixture of basic coal tar oils containing it in which an aqueous solution of urea and a mixture of basic coal tar oils are warmed together, the crystalline urea-lutidine compound formed is crystallized out, separated from the mother liquor and is subsequently decomposed by heating. Urea and substantially pure 2,6-lutidine are recovered from the decomposition products.

I have now discovered that 2,6-lutidine also has a characteristic reaction with thiourea with which under certain conditions it forms a crystalline compound containing the thiourea combined with the 2,6-lutidine in a molar ratio of approximately 2:1, and containing about one mol of water. I have discovered also that while thiourea will not react substantially with a mixture of basic coal tar oils such as a commercial beta-picoline cut, containing 2,6-lutidine, to form this crystalline compound, when substantially pure 2,6-lutidine is mixed with a warm aqueous solution of thiourea an exothermic reaction takes place and upon subsequent cooling of the reaction mixture a large crop of crystals is obtained which contains the thiourea and 2,6-lutidine and water combined in a molar ratio of approximately 2:1:1.

The crystalline product thus obtained is formed of relatively coarse columnar crystals and may be readily separated from the mother liquor by filtering and washing with a small amount of cold water. The washed crystals are customarily then dried by air drying and there is obtained a substantially pure crystalline compound.

The dried crystalline compound of thiourea and 2,6-lutidine thus obtained is relatively insoluble in cold water but substantially soluble in warm or hot water. The crystals are also substantially insoluble in cold ethyl alcohol and in benzol and alcohol or benzol may be used in washing the crystals if desired. The dried crystals are efflorescent. On heating the dry crystals they decompose forming two layers, a lower layer of thiourea and an upper layer of 2,6-lutidine. The liquid lutidine can be readily separated from the solid thiourea.

The crystalline compound is useful for various purposes. It may be used as a wetting out agent in dye baths. It is also useful as a pharmaceutical insecticide, moth proofing agent or the like. Further it is a valuable intermediate in the preparation of other chemical compounds.

The following specific example illustrates the production of the novel crystalline compound of my invention:

80 parts by weight of thiourea were dissolved in 200 parts by weight of water at a temperature of 55° C. To this solution 80 parts by weight of substantially pure 2,6-lutidine were added. The temperature of the mixture rose to 57° C. during the reaction without external heating. On cooling the reaction mixture to 25° C. a crystalline product was formed which was filtered off, washed with cold water and dried. A yield of 116 parts by weight of dried crystals was obtained. The crystals were coarse and columnar in appearance and were efflorescent.

In another experiment carried out in the same way except that the crystallization was effected at a temperature of 15° C. the yield of crystals obtained was 140 parts by weight.

While my invention has been described herein with reference to certain specific embodiments thereof by way of example, it is to be understood that the invention is not limited to the details of such embodiments except as hereinafter defined in the appended claims.

What I claim is:

1. The crystalline product formed by the reaction of thiourea with substantially pure 2,6-lutidine in aqueous solution.

2. A crystalline thiourea-lutidine compound containing thiourea and water combined with 2,6-lutidine in a molar ratio of approximately 2:1:1.

3. A process of producing a crystalline thiourea-lutidine compound comprising reacting thiourea with substantially pure 2,6-lutidine in aqueous solution, cooling the reaction mixture, separating and recovering the crystalline product thus formed.

GEORGE RIETHOF.